United States Patent
Ibanez-Gil

(10) Patent No.: US 12,172,751 B2
(45) Date of Patent: Dec. 24, 2024

(54) KIT OF PARTS FOR FORMING AN AEROFOIL ASSEMBLY

(71) Applicant: Airbus Operations Limited, Bristol (GB)

(72) Inventor: German Ibanez-Gil, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 165 days.

(21) Appl. No.: 17/952,900

(22) Filed: Sep. 26, 2022

(65) Prior Publication Data

US 2023/0174217 A1     Jun. 8, 2023

(30) Foreign Application Priority Data

Sep. 27, 2021 (GB) ...................... 2113801

(51) Int. Cl.
*B64C 3/28* (2006.01)
(52) U.S. Cl.
CPC ...................... *B64C 3/28* (2013.01)
(58) Field of Classification Search
CPC ...................... B64C 3/28
See application file for complete search history.

(56) References Cited

U.S. PATENT DOCUMENTS

| | | | | |
|---|---|---|---|---|
| 3,002,717 | A * | 10/1961 | Pavlecka | B64C 3/28 52/84 |
| 7,980,515 | B2 * | 7/2011 | Hunter | B64C 23/069 244/198 |
| 2010/0065687 | A1 * | 3/2010 | Douglas | B64C 3/28 244/130 |
| 2016/0244143 | A1 * | 8/2016 | Foster | B64C 3/28 |
| 2019/0002079 | A1 * | 1/2019 | Schlipf | B64C 3/187 |
| 2019/0002080 | A1 * | 1/2019 | Schlipf | B64C 3/26 |
| 2019/0135455 | A1 | 5/2019 | Edwards | |
| 2019/0176960 | A1 * | 6/2019 | McNaught | B64C 3/26 |

FOREIGN PATENT DOCUMENTS

WO     2020/239715     12/2020

OTHER PUBLICATIONS

Extended European Search Report for Application No. 22197021.3, nine pages, dated Jan. 30, 2023.
Combined Search and Examination Report for GB Application No. 2113801.1, dated Jun. 17, 2022 (11 pages).

* cited by examiner

*Primary Examiner* — Michael H Wang
(74) *Attorney, Agent, or Firm* — Nixon & Vanderhye P.C.

(57) ABSTRACT

A kit of parts for forming an aerofoil assembly is disclosed having a torsion box structure including a first attachment point and a second attachment point, the first and second attachment points being separated from each other along a separation axis, and a fixed leading or trailing edge structure including corresponding first and second attachment points, wherein a first structure includes a slidebly mounted abutment piece slideable along a slide path extending in a direction parallel to the separation axis and a fixing mechanism for fixing the slidebly mounted abutment piece. A second structure includes a corresponding abutment feature having a first abutment surface facing in a direction parallel to the separation axis of the second structure, such that, in use, the abutment piece prevents relative movement of the first and second structures.

27 Claims, 5 Drawing Sheets

KIT OF PARTS FOR FORMING AN AEROFOIL ASSEMBLY

CROSS RELATED APPLICATION

This application claims priority to United Kingdom Patent Application GB 2113801.1 filed Sep. 27, 2021, the entire contents of which is hereby incorporated by reference.

TECHNICAL FIELD

The present invention relates to a kit of parts for forming an aerofoil assembly, to an aerofoil assembly, and to a method for use in assembling an aerofoil assembly.

BACKGROUND

Aerofoil structures that are found in a variety of aircraft, spacecraft and wind turbine applications typically comprise a torsion box structure, which includes one or more longitudinal spars, a plurality of transverse ribs, and is enclosed by structural covers. A fixed leading edge (FLE) structure and/or a fixed trailing edge (FTE) structure may be attached to such a torsion box structure, to form an aerofoil shape.

When applied to aircraft wings and stabilizers the torsion box structure is often referred to as the "wing box". A wing box construction used commonly in commercial airliners includes a front spar, a rear spar, an upper wing cover (skin) extending between the front spar and the rear spar, and a lower wing cover (skin) extending between the front spar and the rear spar. One or more wing box ribs may also be included between the spars and covers. Each of the front and rear spars may be formed as a C-section with upper and lower flanges extending from an upstanding web. The upper and lower wing covers may be attached to the flanges of the front and rear spars. FTE and FLE structures of the wing, such as the leading edge D-nose, may be supported by butt-straps attached to overhanging edges of the upper and lower covers.

The overall shape of the aerofoil structure fixed assembly must conform to a predefined shape, in order to provide desired aerodynamic properties. Any misalignment of various members may result in a shape deviation, which when operated in an aerodynamic flow might result in unintended performance and handling qualities of the aerofoil structure. Therefore; the exact final position of the various members relative to one another in the assembled aerofoil structure (i.e. when fixed in an operational configuration) is of critical importance throughout the assembly process. Variations in the dimensions of the components of the aerofoil structure from an engineering ideal (normally governed by manufacturing drawings) must be controlled within pre-determined angular and linear dimension limits (commonly referred to as engineering tolerances).

Such engineering tolerances can result in gaps between the mating surfaces of components, which must normally be rectified. US 2019/0176960 discloses a way of dealing with this issue by using first and second mounting features that engage to prevent relative movement of a torsion box structure and a fixed leading or trailing edge structure in a chordwise direction.

However, an issue that US 2019/0176960 does not yet consider is how to prevent movement between the two structures in a vertical direction. In particular, there is no consideration of the potential difference in distance (between an upper attachment point (where the first and second mounting features are) and a lower attachment point) of the two structures.

The present invention seeks to mitigate the above-mentioned problems. Alternatively or additionally, the present invention seeks to provide an improved kit of parts for forming an aerofoil assembly.

SUMMARY

A first aspect of the present invention provides a kit of parts for forming an aerofoil assembly, the kit of parts comprising a torsion box structure comprising a first attachment point and a second attachment point, the first and second attachment points being separated from each other along a separation axis, and a fixed leading or trailing edge structure comprising corresponding first and second attachment points for attaching to the first and second attachment points of the torsion box structure, the first and second attachment points being separated from each other along a separation axis, wherein a first structure of the torsion box structure and the fixed leading or trailing edge structure comprises a slidebly mounted abutment piece slideable along a slide path extending in a direction parallel to the separation axis of the first structure, and a fixing mechanism for fixing the slidebly mounted abutment piece in a chosen location on the slide path, wherein a second structure of the torsion box structure and the fixed leading or trailing edge structure comprises a corresponding abutment feature, for abutting against the slidebly mounted abutment piece of the first structure, the abutment feature comprising a first abutment surface facing in a direction parallel to the separation axis of the second structure, such that, in use, the slidebly mounted abutment piece of the first structure can be slid to abut the first abutment surface of the second structure and be fixed in that location by the fixing mechanism, to prevent relative movement of the first and second structures in the separation axis.

Such a kit of parts enables movement and fretting of the two structures to be prevented in the separation axis. Hence, the kit of parts allows for a certain amount of tolerance in the difference between the distance between the first and second attachment points of the torsion box structure, on one hand, and the distance between the first and second attachment points of the fixed leading or trailing edge structure, on the other hand.

The two sets of corresponding attachment points are separated by substantially the same, allowing for tolerances, separation distances in all three orthogonal axes. This means the second attachment points (i.e. the second attachment point of the first structure and the second attachment point of the second structure) can be located together when the first attachment points (i.e. the first attachment point of the first structure and the first attachment point of the second structure) are located together.

The second structure is not the first structure. In other words, the second structure is the other/different structure, from the first structure.

The separation axis is not necessarily defined as a single axis notionally drawn directly between the first and second attachment points. Instead, the two attachment points may be separated along the separation axis and also another axis, orthogonal to the separation axis. In other words, the two attachment points are separated by a distance in the separation axis (e.g. z axis). They may also be separated by a distance in an orthogonal axis (e.g. x axis).

Similarly, the slide path may extend in a direction parallel to the separation axis (e.g. z axis) and also in one (or two) further directions, orthogonal to the separation axis/direction (and each other) (e.g. x and/or y axes).

Similarly, the first abutment surface of the abutment feature faces in a direction parallel to the separation axis of the second structure (e.g. z direction). It may also face one (or two) further directions, orthogonal to the separation axis/direction (and each other) (e.g. x and/or y axis). The slidebly mounted abutment piece may be slidebly mounted on the first structure. The slideably mounted abutment piece may be slideable along a slide path on the first structure.

In this document, the terms axis and direction are used to indicate similar, but slightly different things. The term "axis" refers to the line defining both opposite (at 180 degrees to each other) directions along that axis. The term "direction" refers to the orientation along only one of the two opposite directions.

For example, vertical axis refers to a notional line extending vertically, both up and down. Vertical direction refers to a line extending only upward (or downward) parallel to, or along, the vertical axis. Similarly, chordwise axis refers to a line extending chordwise, both fore and aft. Chordwise direction refers to a line extending only one way (fore or aft) parallel to, or along, the chordwise axis. Similarly, spanwise axis refers to a line extending spanwise, both left and right (port and starboard). Spanwise direction refers to a line extending only one way (left or right) parallel to, or along, the spanwise axis.]

Preferably, the separation axis is a substantially vertical axis, with respect to an intended operational orientation of the aerofoil assembly.

For example, the first and second attachment points of the torsion box structure and fixed leading or trailing edge structure may be aligned vertically with each other, or substantially aligned, such that the first attachment point is substantially above and in line with the second attachment point in the vertical direction. The first and second attachment points may also be separated along a second direction, for example in a chordwise direction/axis, orthogonal to the vertical direction. The first and second attachment points may not be separated in a spanwise direction/axis (orthogonal to the vertical and chordwise directions/axes). The first attachment points may correspond to an upper attachment of the torsion box structure and the fixed leading or trailing edge structure. The second attachment points may correspond to a lower attachment of the torsion box structure and the fixed leading or trailing edge structure.

The slidebly mounted abutment piece may be located adjacent to the first or second attachment point of the first structure. The slidebly mounted abutment piece may be located adjacent to the second (lower) attachment point of the first structure.

The abutment feature may be located adjacent to the first or second attachment point of the second structure. The abutment feature may be located adjacent to the second (lower) attachment point of the second structure.

The first structure may comprise a main body and a fitting, fixedly attached to the main body, and wherein the slidebly mounted abutment piece is slidebly mounted on the fitting. The first or second attachment point of the first structure may be located on the fitting. For example, the second (lower) attachment point may be located on the fitting. The fixing mechanism may be located on the fitting.

Preferably, the first structure is the torsion box structure and the second structure is the fixed leading or trailing edge structure.

The fixed leading or trailing edge structure may be a fixed leading edge structure.

Preferably, the slide path also extends in a second direction, orthogonal to the separation axis.

In other words, the path extends in more than one orthogonal direction. For example, it may extend vertically and in a chordwise direction. This allows the abutment piece to move in more than one orthogonal direction. Hence the abutment piece is able to abut against the abutment feature of the second structure, in more than one axis/direction.

More preferably, the slide path extends in a third direction, orthogonal to the separation axis and second direction.

In other words, the path extends in three orthogonal directions. For example, it may extend vertically and in a chordwise direction and in a spanwise direction. This allows the abutment piece to move in three orthogonal directions. Hence the abutment piece is able to abut against the abutment feature of the second structure, in more than one axis/direction.

Preferably, the slide path is angled such that it extends simultaneously in the direction parallel to the separation axis and in the second direction.

This means that as the location of the abutment piece along the separation axis changes, so does the location of the abutment piece along the second axis/direction. For example, this may mean that if the location in one direction (e.g. the second direction) is fixed, the location in the other direction (e.g. the separation direction) is fixed.

The path may be angled such that it extends simultaneously in the direction parallel to the separation axis and the third direction. This means that as the location of the abutment piece in the separation axis changes, so does the location of the abutment piece in the third axis/direction. For example, this may mean that if the location in one direction (e.g. the third direction) is fixed, the location in the other direction (e.g. the direction parallel to the separation axis) is fixed.

Preferably, the fixing mechanism comprises a fixing arrangement to fix the location of the slidebly mounted abutment piece along the second direction.

Hence, this may consequently fix the location of the slidebly mounted abutment piece along the direction parallel to the separation axis.

Alternatively, or additionally, the fixing mechanism may comprise a fixing arrangement to fix the location of the slidebly mounted abutment piece along the third direction. Hence, this may consequently fix the location of the slidebly mounted abutment piece in the direction parallel to the separation axis.

More preferably, the fixing arrangement comprises a fixing pin, able to fix the abutment piece into abutment with the corresponding abutment feature of the second structure by fixing the location of the abutment piece along the second direction.

Alternatively, or additionally, the fixing mechanism may comprise a fixing pin, able to fix the abutment piece into abutment with the corresponding abutment feature of the second structure by fixing the location of the abutment piece along the third direction.

The fixing pin may be able to urge the abutment piece into abutment with the corresponding abutment feature of the second structure by urging the abutment piece in the second and/or third directions.

The abutment piece may be slideably mounted relative to an axis of the fixing pin. The fixing pin (axis) may pass through or into a(n angled) slot of the abutment piece.

Preferably, the abutment piece comprises a base portion and a protruding portion protruding from the base portion, the protruding portion providing a number of abutment surfaces for abutting against the abutment feature of the second structure.

The abutment piece may be slidebly mounted to the first structure at/by one or more locations on the base portion. For example, the piece may be slidebly mounted by one or more runners, the runners being attached to the base portion. Each of the one or more runners may comprise a pin. Each of the one or more runners may be accommodated in a slide slot of the first structure.

More preferably, the protruding portion is in the form of a wedge providing a first angled abutment surface angled to face simultaneously in a direction parallel to the separation axis and in a direction orthogonal to the separation axis.

This allows the protruding portion to abut the second structure in a direction parallel to the separation axis and in a direction orthogonal to the separation axis. The orthogonal direction may be the third direction.

Even more preferably, the protruding portion provides a second abutment surface facing in a direction orthogonal to the separation axis.

This allows the protruding portion to abut the second structure along an orthogonal axis, for example a further orthogonal direction. The (further) orthogonal direction may be the second direction.

Preferably, the protruding portion provides a third abutment surface facing in an opposite direction along the separation axis to the first abutment surface.

This allows for the protruding portion to abut the second structure in the separation axis in two opposite ways/senses/directions.

Preferably, the first abutment surface of the abutment feature is angled to face simultaneously in a direction parallel to the separation axis and in a direction orthogonal to the separation axis.

This allows the abutment feature to abut the abutment piece along the separation axis and in a direction orthogonal to the separation axis. The orthogonal direction may be a direction along a third (spanwise) axis of the second structure. This first abutment surface may abut against the first abutment surface of the abutment piece.

The abutment feature and/or the abutment piece/protruding portion/wedge may allow for the converging abutment of the corresponding surfaces.

More preferably, the abutment feature provides a second abutment surface facing in a direction orthogonal to the separation axis.

This allows the abutment feature to abut the abutment piece in an orthogonal direction. The orthogonal axis may be the second (chordwise) axis. This second abutment surface may abut against the second abutment surface of the abutment piece.

Preferably, the abutment feature provides a third abutment surface facing in an opposite direction along the separation axis to the first abutment surface.

This allows for the abutment feature to abut the abutment piece in the separation axis in two opposite ways/senses/directions. This third abutment surface may abut against the third abutment surface of the abutment piece.

Preferably, the abutment feature comprises a slot for accommodating the slidebly mounted abutment piece.

For example, it may accommodate the protruding portion of the abutment piece. The slot may define a number of abutment surfaces, for example the first, second and third abutment surfaces of the abutment feature.

Preferably, the first attachment point of the torsion box structure comprises a first mounting feature and the first attachment point of the fixed leading or trailing edge structure comprises a second mounting feature configured to engage with the first mounting feature, wherein the first mounting feature and the second mounting feature are mutually configured to permit the first and second mounting features to be moved into engagement with each other along a first direction, and to prevent relative movement of the first and second mounting features along a second direction when the first and second mounting features are engaged with each other.

The first direction may be a direction parallel to the separation axis. The first attachment point may be the upper attachment point. The kit of parts may have similarities to that described in US 2019/0176960. For example, the first attachment point may be similar to the first mounting feature of the arrangement of the aerofoil structure of US 2019/0176960.

As further examples:

The first axis/direction may be a vertical axis/direction,

The second axis/direction may be a chordwise axis/direction,

The kit of parts may further comprise a locking component for preventing disengagement of the second mounting feature from the first mounting feature, wherein the locking component is configured to prevent relative movement of the first and second mounting features along the first direction when the first and second mounting features are engaged with each other, The fixed leading or trailing edge structure may comprise an outer skin having an opening, and wherein the opening is configured to permit access to the second mounting feature through the opening, The kit of parts may further comprise a cover panel configured to close the opening, wherein the cover panel is configured such that the cover panel and the outer skin form a substantially smooth aerodynamic surface when the cover panel is closing the opening, The first mounting feature may comprise a fitting fixedly attached to the torsion box structure, The torsion box may comprise a spar, and the fitting may be fixedly attached to a web part of the spar and extend outwardly from the web part of the spar, The second mounting feature may comprise a pin oriented to be substantially parallel to a major axis of the torsion box structure when the fixed leading or trailing edge structure is attached to the torsion box structure, The pin may be mounted to the fixed leading or trailing edge structure by a spherical bearing, such that the orientation of the pin relative to the fixed leading or trailing edge structure is adjustable, The pin may be mounted to a rib of the fixed leading or trailing edge structure, The fitting may comprise a first interface surface defining a recess configured to receive the pin and to substantially prevent movement of the pin along the second direction when the pin is received in the recess, The cross-sectional shape of the recess may be configured to match the cross-sectional shape of the pin, The locking component may comprise a clamp plate, wherein the clamp plate comprises a second interface surface configured to cooperate with the first interface surface and an outer surface of the pin, when the pin is received in the recess of the first interface surface, to prevent movement of the pin away from the fitting along the first direction, The clamp plate may be configured to be fastened to the fitting by fasteners accessible through the opening, and/or The torsion box structure may comprise one or more further first mounting features and the fixed leading or trailing edge structure further comprises one or more further second mounting features, wherein the first mounting features are spaced along the torsion box structure in the spanwise direction according to a predetermined arrangement corresponding to an arrangement of the second mounting features on the fixed leading or trailing edge structure.

Preferably, the fixed leading or trailing edge structure comprises one or more systems for actuating a moveable device comprised in or mountable to the aerofoil assembly.

The torsion box structure may comprise one or more further first and second attachment points and the fixed leading or trailing edge structure may comprise one or more further first and second attachment points. The first attachment points may be spaced along the torsion box structure in the spanwise direction according to a predetermined arrangement corresponding to an arrangement of the first attachment points on the fixed leading or trailing edge structure. The second attachment points may be spaced along the torsion box structure in the spanwise direction according to a predetermined arrangement corresponding to an arrangement of the second attachment points on the fixed leading or trailing edge structure. Similarly, a number of sets of slidebly mounted abutment pieces, fixing mechanisms and abutment features may be provided correspondingly spaced apart in the spanwise direction along the torsion box structure and fixed leading or trailing edge structure.

Preferably, the fixed leading or trailing edge structure is of a modular design.

According to a second aspect of the invention, there is provided an aerofoil assembly formed from the kit of parts as described above.

Preferably, the aerofoil assembly is an aircraft wing or part of an aircraft wing.

According to a third aspect of the invention, there is provided a method for use in assembling an aerofoil assembly, the method comprising providing a torsion box structure comprising a first attachment point and a second attachment point, the first and second attachment points being separated from each other along a separation axis, and being positioned to correspond to first and second attachment points on a leading or trailing edge structure of the aerofoil assembly, arranging the leading or trailing edge structure on the torsion box structure by engaging the two first attachment points together and engaging the two second attachment points together, sliding an abutment piece along a slide path extending in a direction parallel to the separation axis on either the torsion box structure or the leading or trailing edge structure until the abutment piece abuts against an abutment surface facing in a direction parallel to the separation axis on the other structure, and fixing the abutment piece in a chosen location on the slide path to prevent relative movement of the two structures in the separation axis.

Preferably, the separation axis is substantially vertical with respect to an intended operational orientation of the aerofoil assembly.

Preferably, the slide path also extends in a second direction, orthogonal to the separation axis and the abutment piece is slid in the second direction.

More preferably, the slide path extends in a third direction, orthogonal to the separation axis and second direction, and the abutment piece is slid in the third direction.

Preferably, the abutment piece is fixed in the chosen location along the second direction.

Preferably, the abutment surface of the other structure is angled to face in a direction parallel to the separation axis and in a direction orthogonal to the separation axis, and wherein the abutment piece is slid to abut against the abutment surface in these two orthogonal directions.

Preferably, the other structure also provides a second abutment surface facing in a direction orthogonal to the separation axis, and wherein the abutment piece is slid to abut against the second abutment surface.

Preferably, the abutment surface is defined by a slot on the other structure, and wherein the slot accommodates the abutment piece.

The slot may define more than one abutment surface of the abutment feature.

Preferably, the method comprises assembling a kit of parts as described above.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the invention will now be described, by way of example only, with reference to the accompanying drawings, in which.

DETAILED DESCRIPTION

Figure 1:
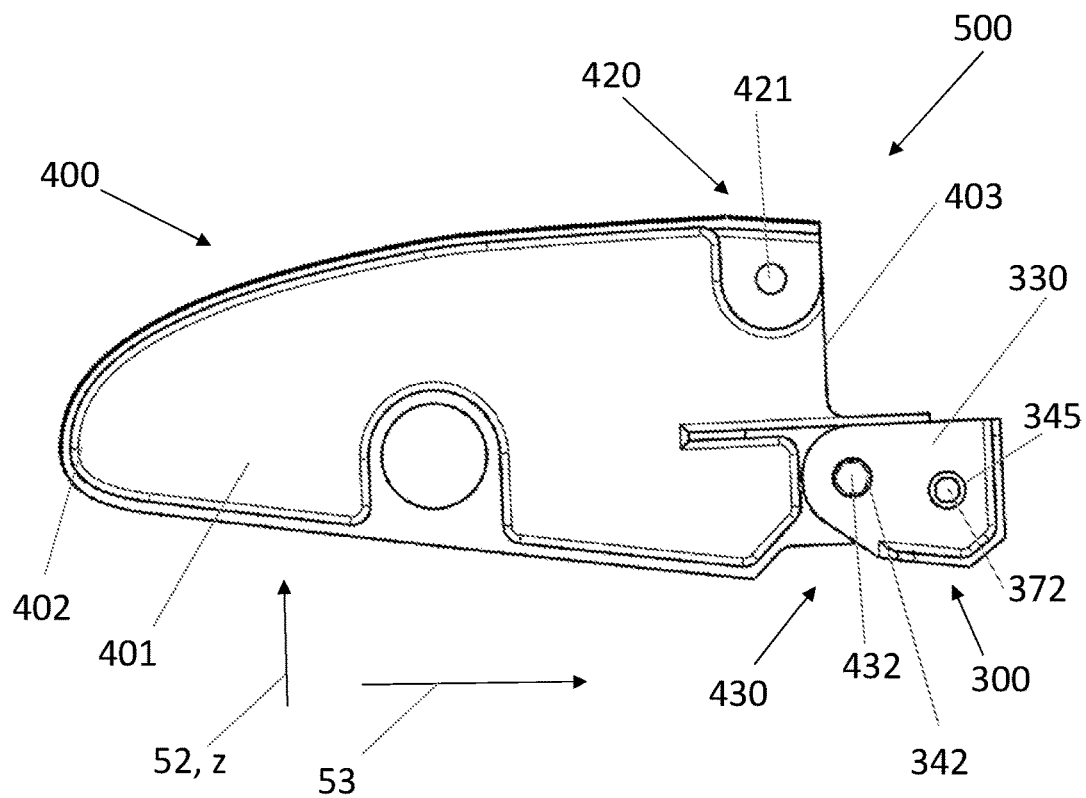
FIG. 1 shows a side (spanwise) view of a rib of a leading edge structure, in location with a fitting of a wing torsion box structure.
Figure 9:
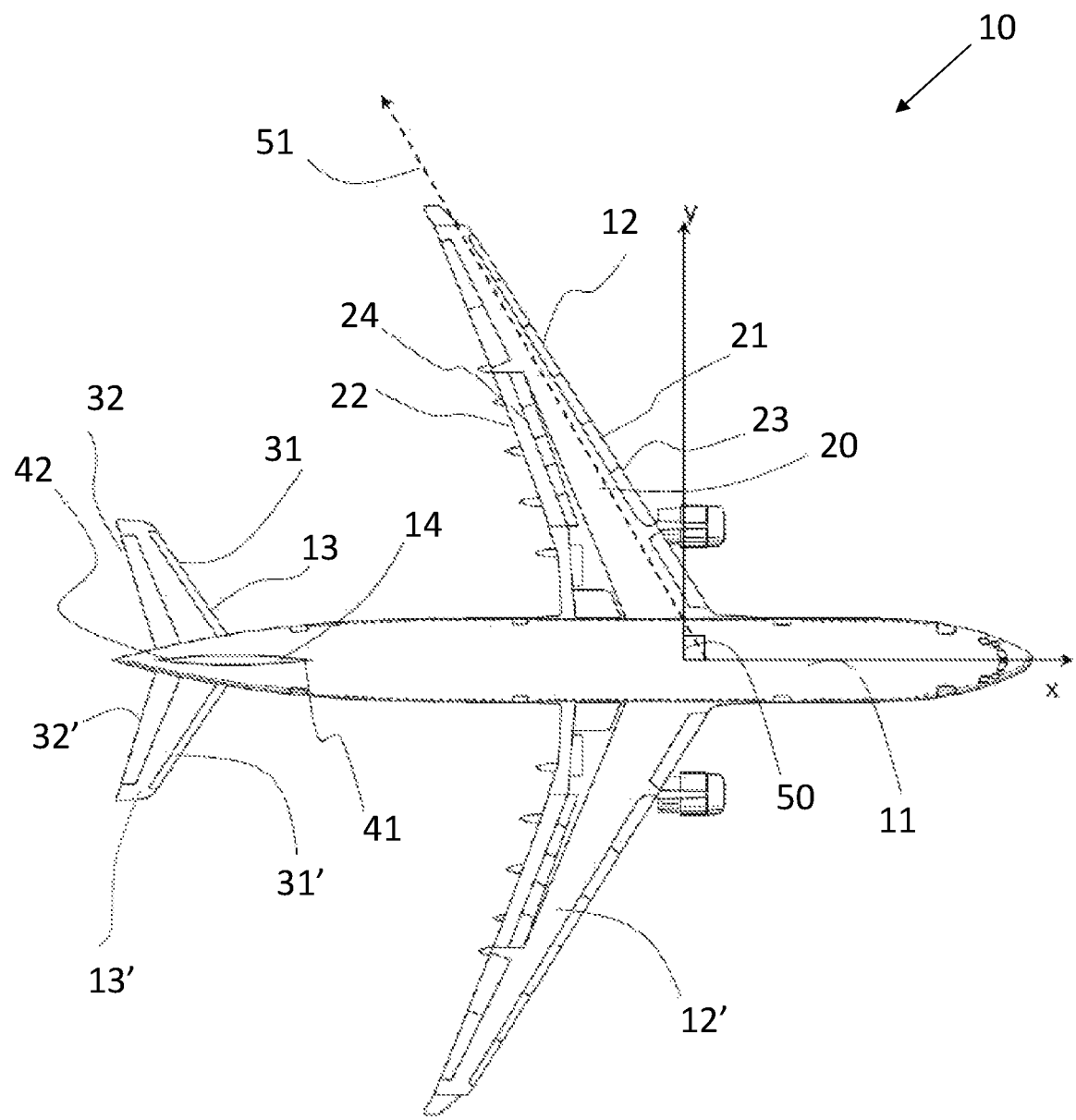
FIG. 9 shows a top schematic view of an example aircraft, including the leading edge structure and wing torsion box structure of FIG. 1.

FIG. 9 shows a top schematic view of an example aircraft 10, including the leading edge structure 400 and wing torsion box structure 300 of FIG. 1.

The aircraft 10 comprises a pair of aerofoil structures 12, 12' in the form of wings, which extend approximately horizontally from a fuselage 11. Although only the wing 12 is described in detail, it may be assumed that the wing 12' has corresponding features. A further pair of aerofoil structures 13, 13' in the form of horizontal tail planes extend approximately horizontally from either side of a rear portion of the fuselage 11. Yet a further aerofoil structure 14 in the form of a vertical tail plane extends vertically from an upper rear portion of the fuselage 11.

The aircraft 10 has a set of orthogonal aircraft axes. The longitudinal axis (x) has its origin at the centre of gravity 50 of the aircraft 10 and extends lengthwise through the fuselage 11 from the nose to the tail in the normal direction of flight. The lateral axis or spanwise axis (y) also has its origin at the centre of gravity and extends substantially crosswise from wing tip to wing tip. The vertical or normal axis (z) (not seen in FIG. 9) also has its origin at the centre of gravity and passes vertically upwards through the centre of gravity.

Figure 2:
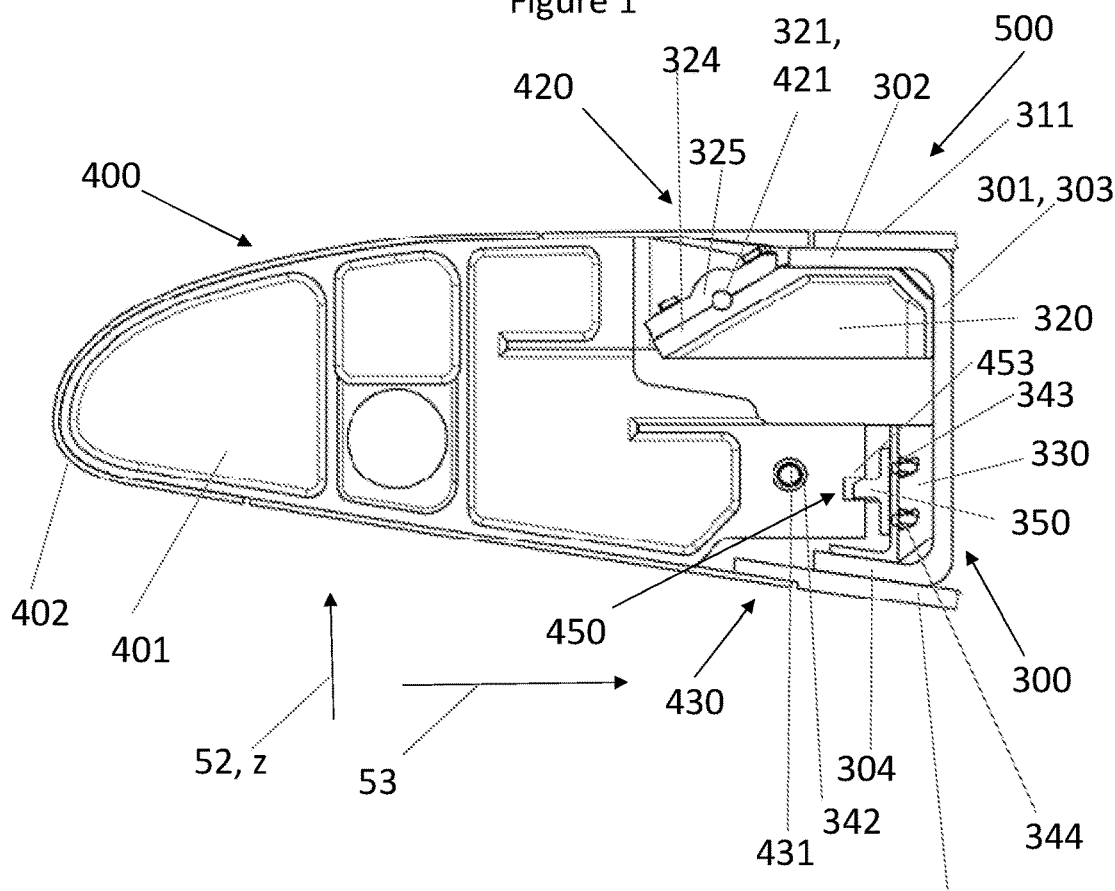
FIG. 2 shows a side (spanwise) view of the rib and fitting of FIG. 1, with an upper portion of the wing torsion box structure also shown and the fitting shown in section.

A further pair of orthogonal axes is defined for the aerofoil structure 12; a first aerofoil axis 51 that is defined by a major (spanwise) dimension of a web 303 of a front spar 301 (see FIG. 3), and a second orthogonal axis 52 defined by a minor dimension of the web 303 of the front spar 301 (see FIGS. 1 and 2). This axis 52 coincides with the z axis in this example. At each point along the span of the aerofoil structure 12, there is also defined a (chordwise) aerofoil axis 53 that is defined by an imaginary chord line joining the leading edge and trailing edge of the aerofoil structure 12 at that point.

As can be seen from FIG. 9, the aerofoil structure 12 comprises a central (wing box) region 20 and a set of high-lift devices called leading edge slats 23, which are mechanically connected to it at the leading edge region 21, in front of the central region. The aerofoil structure 12 also comprises a set of high-lift devices called trailing edge flaps 24, which are mechanically connected to it at the trailing edge region 22, behind the central region. The slats 23 and flaps 24 are moveable (i.e. non-fixed) devices, being actuatable during operation between a fully deployed position and a fully retracted position according to the inputs of a pilot. The purpose of the slats 23 and flaps 24 is to increase the camber and chord length and overall surface area of the wing 12 when deployed, thereby increasing the coefficient of lift that the wing 12 produces when required for slow flight of the aircraft 10. Adjacent to each slat 23 or flap 24 and/or in the areas where no high-lift devices are provided, the leading edge and trailing edge structure of the aerofoil structure 12 is fixed i.e. not configured to be moveable like the slats 23 and flaps 24 during operation of the aircraft 10.

Each of the horizontal tail planes 13, 13' and the vertical tail plane 14 similarly comprises a leading edge 31, 31', 41, a trailing edge 32, 32', 42 and fixed structure.

Any of the aerofoil structures comprised in the aircraft 10 may be formed from a kit of parts according to the invention. FIGS. 1 to 8 show an example kit of parts 500 for forming an aerofoil structure, such as any of the aerofoil structures of the aircraft 10. The kit of parts 500 comprises a torsion box structure 300 and a fixed leading or trailing edge structure 400.

FIG. 1 shows a side (spanwise) view of a rib 401 of a leading edge structure 400, in location with a lower fitting 330 of a wing torsion box structure 300 of wing 12. FIG. 2 shows a side (spanwise) view of the rib and fitting of FIG. 1, with an upper fitting 320 of the wing torsion box structure 300 also shown and the lower fitting 330 shown in partly cutaway view.

The rib 401 has a front nose portion 402 and a rear face 403. Adjacent the rear face 403 are two attachment points; an upper attachment point 420, located towards the top of the rib 401 and a lower attachment point 430, located towards the bottom of the rib 401.

The torsion box structure 300 comprises a front spar 301 in the shape of a C-section with an upper flange 302, central web 303 and lower flange 304. It also has an upper skin 311 and lower skin 312, attached to the upper and lower flanges 302, 304 respectively.

The torsion box structure 300 also comprises an upper fitting 320 and a lower fitting 330, both attached to a front of the spar web 30-3 at upper and lower positions, respectively.

The upper attachment point 420 of the leading edge structure 400 comprises a pin 421 extending spanwise from the rib 401. The pin 421 engages with an attachment point on the upper fixing 320 of the torsion box structure 300. In particular, as can be seen in FIG. 2, the pin 421 sits in a hole 321 formed by a lower fitting body 324 and an upper plate 325 of the upper fitting 320 of the torsion box structure 300. This arrangement may be similar or the same as that disclosed in US 2019/0176960.

The lower attachment point 430 of the leading edge structure 400 comprises a hole 431 extending through the rib 401 (in the spanwise direction) and an attachment bolt 432 extending through the hole 431. The bolt 432, surrounded by a sleeve (not shown), two threaded bushed 436, 437 and two eccentric bushes 434, 435, also extends through holes 341, 342 on the lower fitting 330 of the torsion box structure 300. The bolt 432 is secured in place with a nut 433, to connect the two structures 300, 400 together at the lower attachment point 430, as will be described in more detail later.

The pin 421 and hole 431 on the leading edge structure 400 are designed to be a set distance apart, in both the vertical and chordwise directions. However, as they can only be manufactured to an achievable level of tolerance, these distances may vary slightly.

The pin 321 and holes 341, 342 on the torsion box structure 300 are designed to be a set distance apart, in both the vertical and chordwise directions. However, as they can only be manufactured to an achievable level of tolerance, these distances may vary slightly.

Hence, there will always be some difference in the corresponding locations of the upper and lower attachment points, between the two structures.

Importantly, as can be seen in FIGS. 1 and 2, but will be described in more detail in relation to other Figures, the lower fitting 330 of the torsion box structure 300 further comprises a slide piece 350, slideably mounted to a main body of the fitting 330. It is mounted using pins 355, 356 extending from the slide piece 350 through upper and lower slots 343, 344 of the fitting 330. The slide piece 350 can be fixed in location using a securing pin 372 extending through a hole 345 of a protruding tab of the fitting 330.

Figure 3:
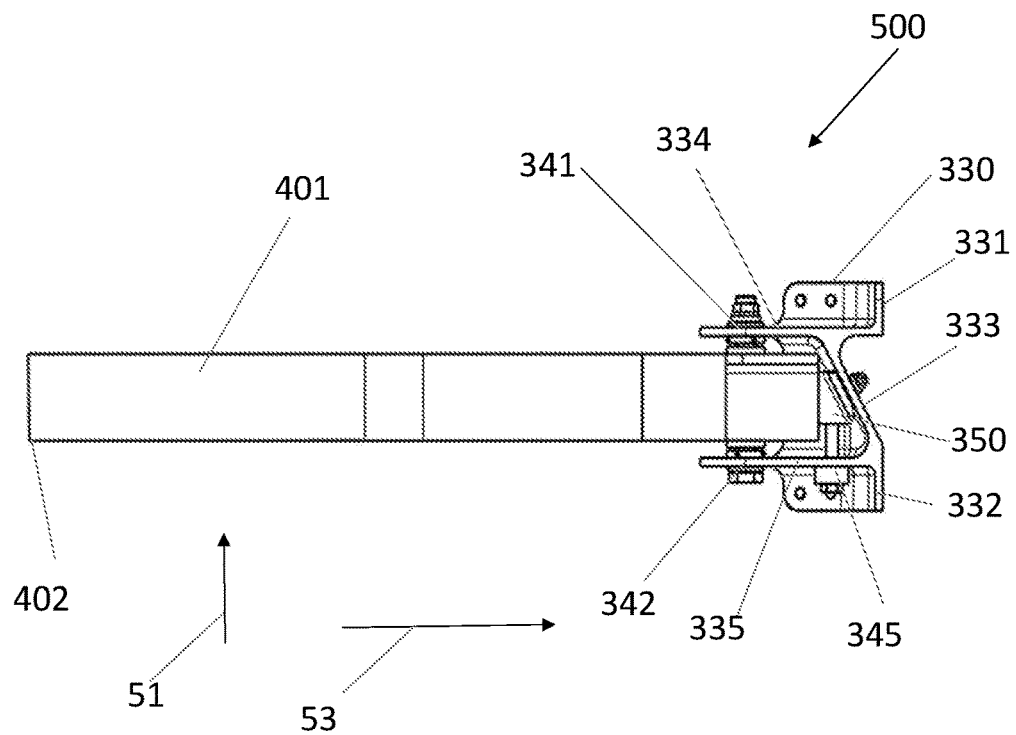
FIG. 3 shows a top view of the rib and fitting of FIG. 1, with a slide piece of the fitting shown in an intermediate position.
Figure 4:
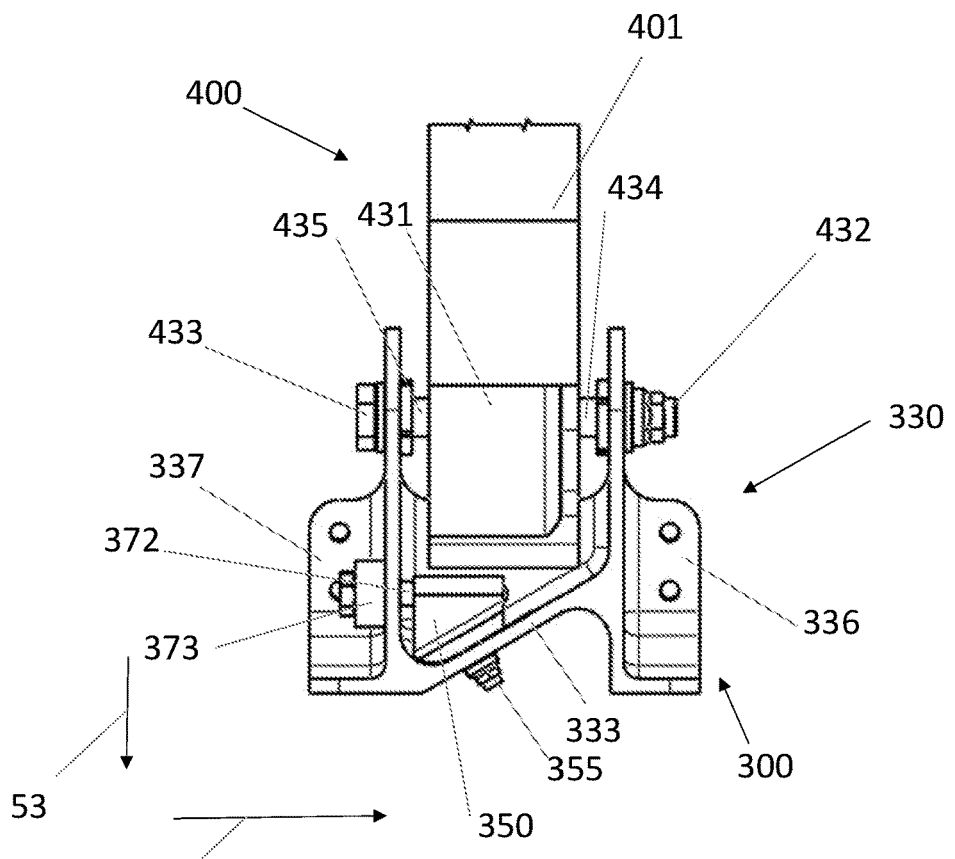
FIG. 4 shows an enlarged top view of the fitting of FIG. 3, with the slide piece shown in a non-abutting position.
Figure 5:
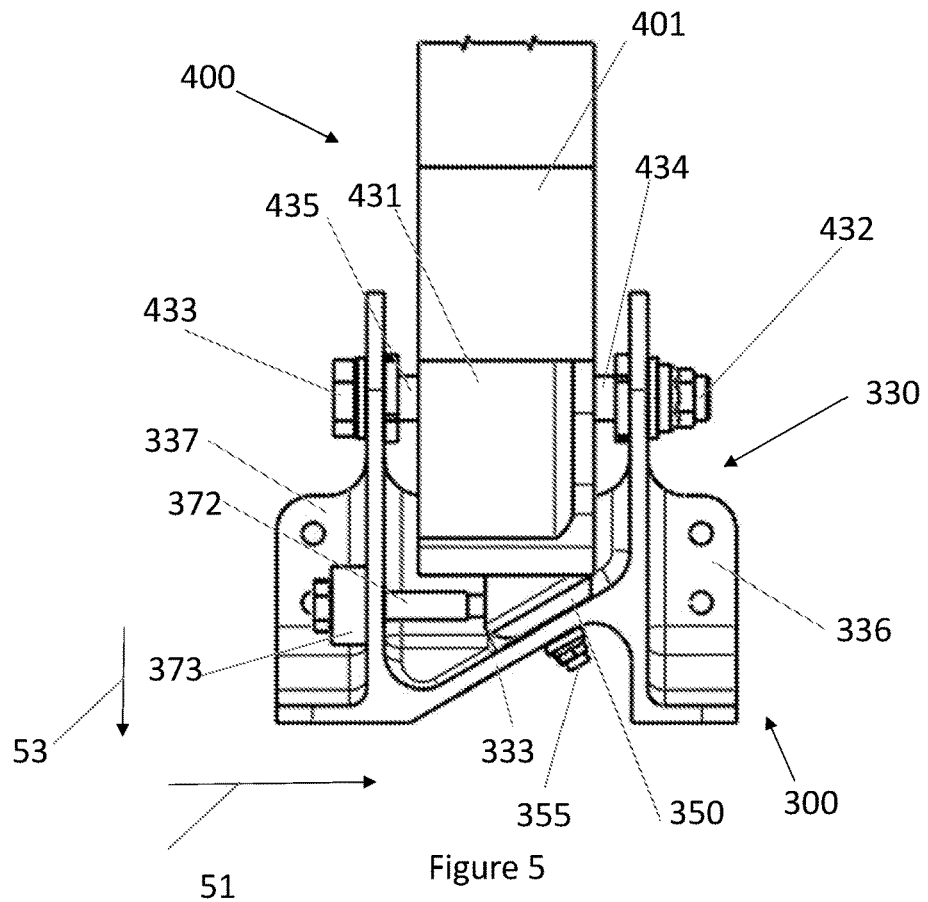
FIG. 5 shows an enlarged top view of the fitting of FIG. 3, with the slide piece shown in an abutting position.

FIG. 3 shows a top view of the rib 401 and lower fitting 330, with the slide piece 350 of the fitting shown in an intermediate position. FIG. 4 shows an enlarged top view of the lower fitting 330, with the slide piece 350 shown in a non-abutting position. FIG. 5 shows an enlarged top view of the lower fitting 330, with the slide piece 350 shown in an abutting position.

As will be seen, the slide piece 350 can slide from the non-abutting position shown in FIG. 4, through the intermediate position of FIG. 3, to the abutting position of FIG. 5, where it abuts against the leading edge structure 400. The slide piece 350, during this movement, moves in the spanwise direction 51, as well forwards in the chordwise axis (i.e. in the opposite direction to arrow 53) and also downwards (i.e. in the opposite direction to arrow 52, z).

Figure 6:
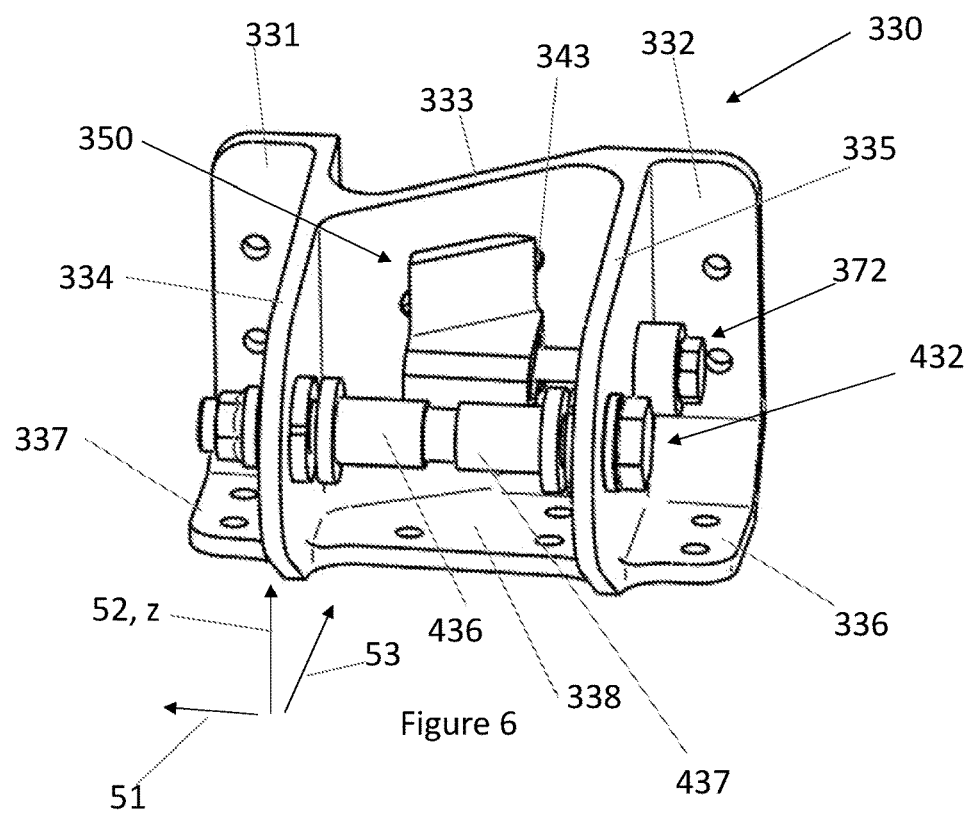
FIG. 6 shows a perspective view of the fitting of FIG. 1, shown with two pins.
Figure 7:
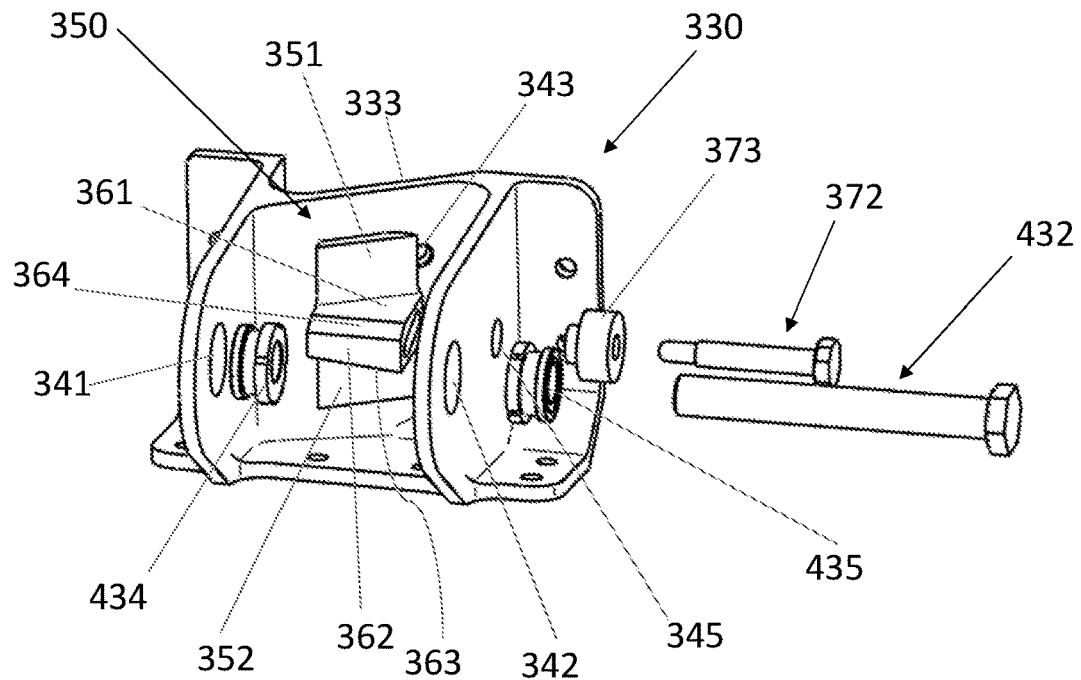
FIG. 7 shows an exploded perspective view of the fitting of FIG. 1, shown with the two pins in exploded view.

FIG. 6 shows a perspective view of the lower fitting 330, shown with two pins; bolt 432 and a securing pin 372. FIG. 7 shows an exploded perspective view of the lower fitting 330, shown with the two pins in exploded view.

These FIGS. 3 to 7) will be used to describe the lower fitting 330, including the slide piece 350 in more detail.

The lower fitting 330 comprises two rear flanges 331, 332 which are used to attach the fitting 330 to the front of the web 303 of the front spar 301. It also has a lower face comprising a central flange 338 and two outer flanges 336, 337. These flanges are used to fix the fitting to the lower flange 304 of the front spar 301. It also has two protruding tabs 334, 335, which extend outwards (frontwards, chordwise). The protruding tabs 334, 335 include a hole each 341, 342 for accommodating the bolt 432 of the lower attachment point 430 of the leading edge structure 430.

Importantly, the fitting 330 comprises a back wall 333, extending between the two protruding tabs 334, 335, which is sloped/angled such that it extends in spanwise, chordwise, and also vertical axes. This spanwise and chordwise extending can be seen in FIGS. 4 and 5, for example.

The back wall has two slots; an upper slot 343, seen in FIG. 6 and FIG. 1, and a lower slot 344, only seen in FIG. 1. These back wall slots 343, 344 are angled/sloped on the face of the back wall and are used to slideably mount the slide piece 350 so that it can slide along the slope/angle of the back wall 333 and also, simultaneously move up and down along the slope of the slots 343, 344.

The slide piece 350 itself comprises an upper and a lower base flange 351, 352 with a wedge shaped protrusion 360 (protruding forwards in a chordwise direction) in between the two base flanges 351, 352.

The upper base flange 351 has an upper pin 355 extending backwards from it, such that it is accommodated in the upper slot 343 of the back wall 333 of the fitting 330. Similarly, the lower base flange 352 has a lower pin 356 extending backwards from it, such that it is accommodated in the lower slot 344 of the back wall 333 of the fitting 330.

The wedge-shaped protrusion 360 extends forwards towards the rib 401 and comprises a number of surfaces:
  a first upper surface 361, which faces upwardly,
  a second forward surface 362 which is sloped to face forwardly (towards the rib 401) and also angled to face in a spanwise direction,
  a chamfered corner 364 between the first and second surfaces, and
  a third lower surface 363, which is sloped to face downwardly and also angled to face in a spanwise direction.

Figure 8:
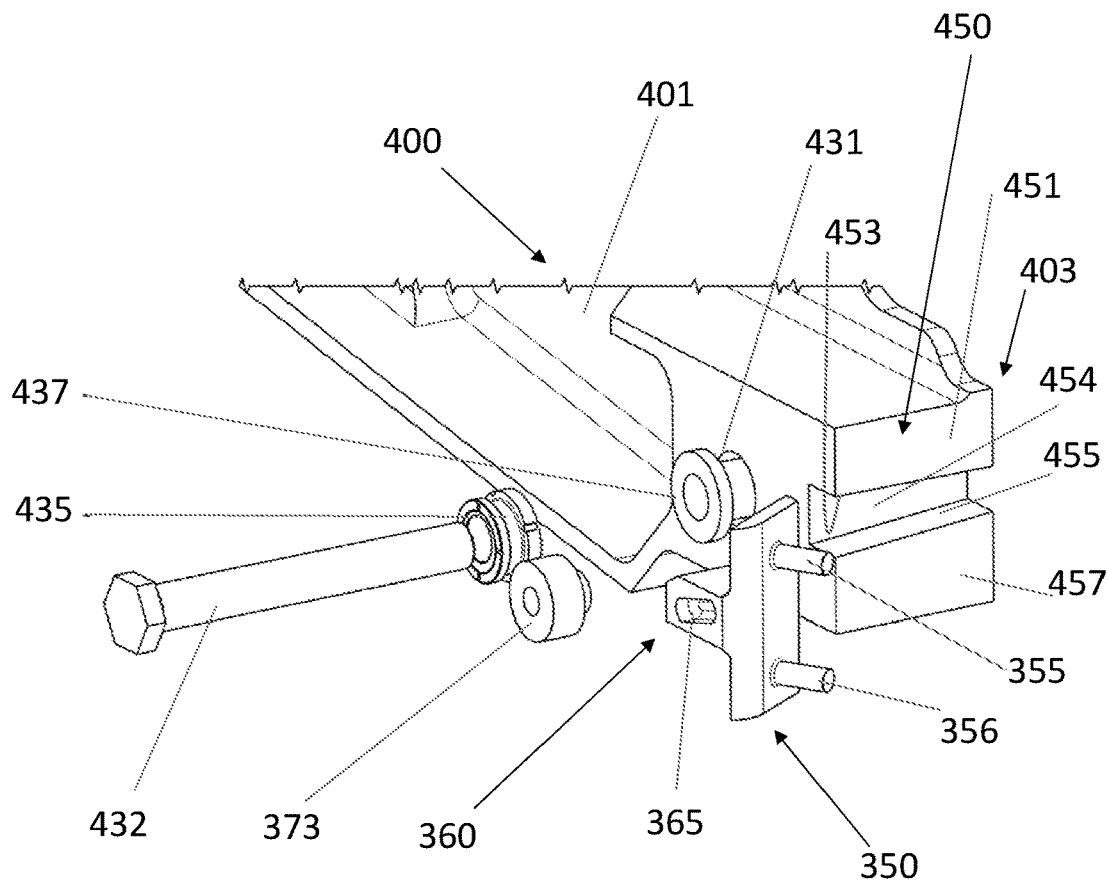
FIG. 8 shows a rear perspective view of the leading edge rib of FIG. 1, shown with a pin and the slide piece in exploded view.

FIG. 8 shows a rear perspective view of the leading edge rib 401, shown with the attachment bolt 432 and the slide piece 350 in exploded view.

The wedge-shaped protrusion 360 also has a long side face (facing in a spanwise direction) which has a slanted slot 365 in it. This is most clearly seen in FIG. 8. The slanted slot 365 is slanted so as to extend vertically as well as chordwise.

The securing pin 372 extends through the hole 345 in the protruding tab 334 of the lower fitting 330 and into the slanted slot 365 to secure the slide piece 350 in a chosen position along the slide slots 343, 344. It is also noted that a bush 373 is used surrounding the pin 372, outside of the protruding tab 334.

As can also be seen in FIG. 8, at the lower portion of the rear face 403 of the rib 401 is an inwardly (i.e. inwards towards the front of the rib) extending slot feature 450. This slot feature accommodates the wedge-shaped protrusion 360 such that it slides along it.

The slot feature 450 comprises an upper backward face 451, which corresponds with the upper base flange 351 of the slide piece 350. It has a downwardly facing upper surface 453, which defines the top of the slot. This surface 453 corresponds with the first upper surface 361 of the wedge-shaped protrusion 360. It has an inner back surface 454 which defines the back of the slot. This surface is slanted so as to correspond to the sloped second forward face 362 of the wedge-shaped protrusion 360. It has an upwardly facing lower face 455, which defines the bottom of the slot. This surface 455 is slanted so as to correspond with the third lower surface 363 of the wedge-shaped protrusion 360. It also has a lower backward face 457, which corresponds with the lower base flange 352 of the slide piece 350.

In use, the torsion box structure 300 is supported in a desired position and/or orientation, for example using a (moveable) jig, or manually by aircraft assembly personnel. The leading edge structure 400 is arranged on the torsion box structure 300, for example by moving it downwards, to engage the pin 421 on the lower fitting body 324. This prevents the leading edge structure 400 moving in a chordwise manner relative to the torsion box structure 300. Any jigs or other support mechanisms used to support the leading edge structure 400 may therefore be removed at this point, or later.

The pin 421 can then be further secured by upper plate 325. This step may comprise accessing the pin 421 and/or lower fitting body 324 through an opening (not shown) in an outer skin of the leading edge structure 400.

Then, the hole 431 in the lower region of the rib 401 is lined up with the holes 341, 342 in the lower fitting 330 of the torsion box structure 300, and bolt 432 is placed through the holes to secure the two structures together at the lower attachment point 430. The eccentric bushes 434, 435 are also used and are rotated to achieve the desired position of the leading edge structure 400 with respect to the wing torsion box structure 300. Threaded bushed 436, 437 are then used to fix the spanwise position of the leading edge structure 400 with respect to the wing box structure 300.

In order to then prevent any movement in the vertical direction, the slide piece 350 is slid towards its abutting position, where one or more surfaces of the slide piece 350 (and in particular, the wedge-shaped protrusion 360 of it) will abut against one or more faces of the slot feature 450. For example, all of the faces 453, 454 and 455 of the rib 401 of the leading edge structure 400 may be abutted. There will be abutting in various directions, in fact all three orthogonal directions, given the different angles of the surfaces.

The slide piece 350 is then secured in that abutting position by the securing pin 372. This prevents the two structures 300, 400 from moving and fretting with respect to each other, especially in the vertical (z) direction.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In certain examples, any two or more of the components of the torsion box structure 300 may be formed integrally as a unitary member. For example, the front spar 301 may be formed integrally with the upper cover 311. The front spar 301 has an upstanding web 303 (which may be substantially, or close to, vertical in an operational orientation of the aerofoil) which defines a first aerofoil axis, as discussed above. The upper and lower covers 311, 312 may be substantially, or close to, perpendicular to the web of the front spar 301. The torsion box structure 300 may have any suitable construction (various such constructions are known in the art).

In some examples, the fixed leading edge structure 400 may comprise an outer skin fixedly attached to at least one leading edge rib 401, by any suitable mechanism. In other examples, the outer skin may comprise one or more pieces of aluminium sheet (or any composite material) and is bonded to a flange of the leading edge rib such that it defines a desired aerodynamic shape of the leading edge of the completed aerofoil structure. The leading edge rib 401 may be formed from composite material, or any other suitable material e.g. aviation grade aluminium alloy. The fixed leading edge structure 400 may comprise any number of leading edge ribs 401. In some examples, the fixed leading edge structure 400 may comprise one or more pairs of ribs 401, where the spanwise spacing between ribs in a given pair is significantly smaller than the spanwise spacing between a rib in the given pair and the closest rib not in that pair. The rib or ribs may have any suitable construction (various such constructions are known in the art).

In the illustrated example, the torsion box structure 300 comprises a first mounting feature (i.e. pin hole 321 in upper fitting 320 and lower fitting body and upper plate 324, 325) for use in attaching the fixed leading edge structure 400 to the torsion box structure 300. The fixed leading edge structure 400 comprises a second mounting feature (i.e. pin 421) configured to engage with the first mounting feature. The first mounting feature and the second mounting feature may be similar to or the same as the arrangement described in US 2019/0176960.

The various surfaces, slots etc. may extend in any suitable direction/axis. For example, the front spar 301 may have a minor dimension that does not exactly correspond to the z axis, as in the above example. The surfaces/faces of the slot feature 450 and slide piece 350 may extend in any suitable direction/axis and may be appropriately sloped/angled.

Any suitable pins, bolts, bushes, nuts etc. may be used to effectively secure the arrangement in place.

The fittings 320, 330 may be integral, or not, to the torsion box structure.

The arrangement could be the other way around, with the slide piece 350 being part of the leading edge structure 400 and the slot feature 450 may be part of the torsion box structure 300.

Instead of there being abutting by the slide piece 350 against all three faces 453, 454, 455 of the slot feature 450, there may be abutting against only one or two of these faces. For example, there may be abutting against face 455 only. As another example, there may be abutting only against faces 455 and 453. The number of different faces being abutted against will depend on how the different tolerances have resulted.

As another example, a nominal gap may be used between faces 452 and 362 such that face 454 is not subject to unwanted loads "running" through that interface. In other words, the (horizontal) loads will run through the attachment bolt 432 and the fitting tabs 334, 335, instead of the wedge-shaped portion 360. This prevents the wedge-shaped portion 360 pushing the rib forward (and potentially causing issues with pre-stressing).

Any suitable abutment features (such as the slide piece and slot feature) may be used.

In the illustrated example, the fixed leading edge structure 400 is a leading edge structure in the form of a D-nose, although in other examples it may be a trailing edge fixed structure, for a wing or for a horizontal or vertical tail plane, or a different form of leading edge fixed structure. The example leading edge structure 400 may be provided as a modular assembly, that is, a unitary preassembled structural module (hereinafter referred to as a modular leading edge structure). The leading edge structure 400 may also be pre-equipped with systems and/or actuation elements for one or more moveable devices which are to be mounted on the completed aerofoil structure. Such a moveable device may be, for example, a slat, a Krueger, or the like. In examples in which the fixed leading or trailing edge structure is a trailing edge structure, such a moveable device may be, for example, a flap, an aileron, a spoiler, or the like. The use of pre-assembled unitary leading or trailing edge modules is desirable because it allows tolerance gaps to be controlled between a reduced number of components, which reduces the time overall required to assemble an aerofoil structure.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. A kit of parts for forming an aerofoil assembly, the kit of parts comprising:
   a torsion box structure comprising a pin and a hole separated from each other along a separation axis, and
   a fixed leading or trailing edge structure comprising corresponding pin and hole for attaching to the torsion box structure pin and hole, wherein the fixed leading or trailing edge structure pin and hole are separated from each other along a separation axis,
   wherein a first structure of the torsion box structure and the fixed leading or trailing edge structure comprises:
   a slidably mounted slide piece is slidable along a slide path, wherein the slide path is defined by an upper slot and a lower slot, and wherein the slide path is at an oblique angle to the separation axis, and
   a fixing mechanism for fixing the slidably mounted slide piece in a chosen location on the slide path,
   wherein a second structure of the torsion box structure and the fixed leading or trailing edge structure comprises a corresponding abutment feature, for abutting against the slidably mounted slide piece of the first structure, the abutment feature comprising a downwardly facing upper surface facing in a direction parallel to the separation axis,
   wherein the slidably mounted slide piece of the first structure is configured to slide in order to abut the downwardly facing upper surface of the second structure and be fixed in that location by the fixing mechanism, to prevent relative movement of the first and second structures along the separation axis.

2. A kit of parts according to claim 1, wherein the first structure is the torsion box structure and the second structure is the fixed leading or trailing edge structure.

3. A kit of parts according to claim 1, wherein the slide path also extends in a second direction, orthogonal to the separation axis.

4. A kit of parts according to claim 3, wherein the slide path extends in a third direction, orthogonal to the separation axis and second direction.

5. A kit of parts according to claim 3, wherein the slide path is angled such that it extends simultaneously in the direction parallel to the separation axis and in the second direction.

6. A kit of parts according to claim 3 wherein the fixing mechanism comprises a fixing arrangement to fix the location of the slidably mounted slide piece along the second direction.

7. A kit of parts according to claim 6, wherein the fixing arrangement comprises a fixing pin, able to fix the slide piece into abutment with the corresponding abutment feature of the second structure by fixing the location of the slide piece along the second direction.

8. A kit of parts according to claim 1, wherein the slide piece comprises a base portion and a protruding portion protruding from the base portion, the protruding portion providing a number of abutment surfaces for abutting against the abutment feature of the second structure.

9. A kit of parts according to claim 8, wherein the protruding portion is in the form of a wedge providing a first angled abutment surface angled to face simultaneously in a direction parallel to the separation axis and in a direction orthogonal to the separation axis.

10. A kit of parts according to claim 9, wherein the protruding portion provides a second abutment surface facing in a direction orthogonal to the separation axis.

11. A kit of parts according to claim 9, wherein the protruding portion provides a third abutment surface facing in an opposite direction along the separation axis to the first abutment surface.

12. A kit of parts according to claim 1, wherein the first abutment surface of the abutment feature is angled to face simultaneously in a direction parallel to the separation axis and in a direction orthogonal to the separation axis.

13. A kit of parts according to claim 12, wherein the abutment feature provides a second abutment surface facing in a direction orthogonal to the separation axis.

14. A kit of parts according to claim 12, wherein the abutment feature provides a third abutment surface facing in an opposite direction along the separation axis to the first abutment surface.

15. A kit of parts according to claim 1, wherein the first attachment point of the torsion box structure comprises a first mounting feature and the first attachment point of the fixed leading or trailing edge structure comprises a second mounting feature configured to engage with the first mounting feature, wherein the first mounting feature and the second mounting feature are mutually configured to permit the first and second mounting features to be moved into engagement with each other along a first direction, and to prevent relative movement of the first and second mounting features along a second direction when the first and second mounting features are engaged with each other.

16. A kit of parts according to claim 1, wherein the fixed leading or trailing edge structure comprises one or more systems for actuating a moveable device comprised in or mountable to the aerofoil assembly.

17. A kit of parts according to claim 1, wherein the fixed leading or trailing edge structure is of a modular design.

18. An aerofoil assembly formed from the kit of parts according to claim 1.

19. An aerofoil assembly according to claim 18, wherein the aerofoil assembly is an aircraft wing or part of an aircraft wing.

20. A method for use in assembling an aerofoil assembly, the method comprising:
providing a torsion box structure comprising a pin and hole separated from each other along a separation axis, and being positioned to correspond to a pin and a hole on a leading or trailing edge structure of the aerofoil assembly,
arranging the leading or trailing edge structure on the torsion box structure by engaging the corresponding pins and holes together,
sliding a slide piece along a slide path, wherein the slide path is defined by an upper slot and a lower slot, and wherein the slide path is at an oblique angle the separation axis on either the torsion box structure or the leading or trailing edge structure until the slide piece abuts against an abutment surface facing in a direction parallel to the separation axis on the other structure, and
fixing the slide piece in a chosen location on the slide path to prevent relative movement of the two structures in the separation axis.

21. A method according to claim 20, wherein the separation axis is substantially vertical with respect to an intended operational orientation of the aerofoil assembly.

22. A method according to claim 20, wherein the slide path also extends in a second direction, orthogonal to the separation axis and the slide piece is slid in the second direction.

23. A method according to claim 22, wherein the slide path extends in a third direction, orthogonal to the separation axis and second direction, and the slide piece is slid in the third direction.

24. A method according to claim 22, wherein the slide piece is fixed in the chosen location along the second direction.

25. A method according to claim 20, wherein the abutment surface of the other structure is angled to face in a direction parallel to the separation axis and in a direction orthogonal to the separation axis, and wherein the slide piece is slid to abut against the abutment surface in these two orthogonal directions.

26. A method according to claim 20, the other structure also provides a second abutment surface facing in a direction orthogonal to the separation axis, and wherein the slide piece is slid to abut against the second abutment surface.

27. A method according to claim 20, wherein the abutment surface is defined by a slot on the other structure, and wherein the slot accommodates the slide piece.

* * * * *